US012319549B1

(12) United States Patent
Liu

(10) Patent No.: US 12,319,549 B1
(45) Date of Patent: Jun. 3, 2025

(54) MULTIFUNCTIONAL STABLE WINCH HOOK GUIDE RAIL SYSTEM

(71) Applicant: Qingdao Mihong Machinery Co., Ltd., Shandong (CN)

(72) Inventor: Yadan Liu, Shandong (CN)

(73) Assignee: Qingdao Mihong Machinery Co., Ltd, Qingdao (CN)

( * ) Notice: Subject to any disclaimer, the term of this patent is extended or adjusted under 35 U.S.C. 154(b) by 0 days.

(21) Appl. No.: 18/942,793

(22) Filed: Nov. 11, 2024

(51) Int. Cl.
*B66D 1/36* (2006.01)

(52) U.S. Cl.
CPC .................................... *B66D 1/36* (2013.01)

(58) Field of Classification Search
CPC .... B66D 1/36; B66D 1/365–39; B60D 1/185; B60R 19/48
See application file for complete search history.

(56) References Cited

U.S. PATENT DOCUMENTS 10,519,012 B1 * 12/2019 Hare ........................ B66D 1/36
2014/0001428 A1 * 1/2014 Fretz ........................ B66D 1/36 254/395
2017/0121154 A1 * 5/2017 Costa ........................ B66C 1/36
2017/0320710 A1 * 11/2017 Fretz ........................ B66D 1/36
2024/0083378 A1 * 3/2024 Anderson ................ B66D 1/36
2024/0166152 A1 * 5/2024 Zhang ...................... B66D 1/00

* cited by examiner

*Primary Examiner* — Anna M Momper
*Assistant Examiner* — Nathaniel L Adams
(74) *Attorney, Agent, or Firm* — Nicholas Makridakis

(57) ABSTRACT

Disclosed is a multifunctional stable winch hook guide rail system. The system includes: a storage buckle; a guiding groove, where the guiding groove is formed on a front face of the storage buckle, a movable opening is formed on a back face of an inner wall of the guiding groove, and a winch hook is arranged inside the guiding groove; a hanging opening, where the hanging opening is located at a top of the winch hook at a position close to one end thereof, a side of an inner wall of the hanging opening is fixedly connected to a connector, an outer surface of the connector, through an insertion pin, is rotatably connected to a movable buckle. The winch hook can be easily tightened and securely locked in the guiding groove. The winch hook has a uniform and clean appearance and is used for rescue and heavy-duty towing tasks.

6 Claims, 7 Drawing Sheets

MULTIFUNCTIONAL STABLE WINCH HOOK GUIDE RAIL SYSTEM

TECHNICAL FIELD

The present disclosure relates to the technical field of winch hook guide rails, and in particular to a multifunctional stable winch hook guide rail system.

BACKGROUND

A winch is a mechanical device with a vertically mounted warping end that is capable of winding up but not storing a rope under the action of a driving force, and also refers to a windlass with a rotational axis perpendicular to a deck, as well as a self-protection and towing device for vehicles and ships. The winch can be used for self rescue and assistance in harsh environments like snow, swamps, deserts, beaches, and muddy mountain roads.

When the winch is installed on a vehicle, a winch hook needs to be exposed. To facilitate storage and limiting of the winch hook, a multifunctional stable winch hook guide rail device is required.

The winch hook on a similar winch is suspended on a corresponding ring, and shakes with vehicle movement, which is aesthetically unpleasing and easily produces noises.

Therefore, it is necessary to provide a multifunctional stable winch hook guide rail system to solve the above problems.

SUMMARY

The present disclosure provides a multifunctional stable winch hook guide rail system, which solves the problems of aesthetic impairment and noise caused by shaking of winch hooks suspended or hung on vehicle rings during vehicle movement.

In order to solve the above technical problems, the present disclosure provides a multifunctional stable winch hook guide rail system. The system includes: a storage buckle;

a guiding groove, where the guiding groove is formed on a front face of the storage buckle, a movable opening is formed on a back face of an inner wall of the guiding groove, and a winch hook is arranged inside the guiding groove;

a hanging opening, where the hanging opening is located at a top of the winch hook at a position close to one end thereof, a side of an inner wall of the hanging opening is fixedly connected to a connector, an outer surface of the connector, through an insertion pin, is rotatably connected to a movable buckle, one end of the movable buckle is fixedly connected to a safety buckle, the other end of the winch hook is provided with a fixed opening, and a hanging rope pin is arranged inside the fixed opening; and the guiding groove is internally provided with protrusions that enhance stability after the winch hook is snap-fitted, structures of the storage buckle and the winch hook are illustrated in FIGS. 1 and 2, the winch hook is a combination of an aluminum alloy guide hole and a G80 forged steel tow hook, which provides an ultimate solution for towing or recovering and withstands extreme weather conditions due to enhancement by galvanization and powder coating, and avoids the problems of easy rusting and short service life.

Preferably, a mounting opening is formed on the front face of the storage buckle at a position close to either end thereof respectively, and a through opening is formed on a back face of an inner wall of either of the mounting openings.

Preferably, a first mounting frame is fixedly connected to a back face of the storage buckle at a position close to a bottom thereof, and two first rotating blocks are mounted at a top of the first mounting frame at a position close to the back face of the storage buckle; and the position for installing the storage buckle is provided with openings for snap-in connection with the first mounting frame and a second mounting frame.

Preferably, a bottom of the first mounting frame is provided with a drain outlet, and a first extrusion wheel is rotatably connected between the two first rotating blocks; and the first extrusion wheel and a second extrusion wheel correspond to each other in positions, as illustrated in FIG. 3.

Preferably, a second mounting frame is fixedly connected to the back face of the storage buckle at a position close to a top thereof, and a bottom of the second mounting frame is rotatably connected to a second extrusion wheel through two second rotating blocks.

Preferably, a top and a bottom of the storage buckle are both provided with threaded holes, a fixed frame is mounted on the outer surface of the storage buckle through bolts, the front face of the fixed frame is provided with a connection port, and magnetic blocks are installed on both sides of an inner wall of the connection port through bayonets; and openings that can be sleeved on the outer surface of the storage buckle are formed on front and back faces of the fixed frame, the connection port facilitates insertion of a snap-in frame, and the magnetic blocks are installed on both sides of the inner wall of the connection port through the bayonets.

Preferably, a snap-in frame is arranged inside the connection port, iron sheets are fixedly connected to both sides of the snap-in frame, and a front face of the snap-in frame is fixedly connected to a sealing cover; and the sealing cover, in combination of the fixed frame, is capable of sealing the storage buckle.

Compared with the prior art, the multifunctional stable winch hook guide rail system provided by the present disclosure has the following beneficial effects:

The present disclosure provides a multifunctional stable winch hook guide rail system. To facilitate the fixing of the winch hook after mounting of the winch, the storage buckle is installed at a designated position of a vehicle where the winch is installed, the guiding groove is formed on the front face of the storage buckle, and the winch hook can be stored through the guiding groove; grooves that correspond to protrusions on an outer surface of the winch hook are arranged on the inner wall of the guiding groove, which increases stability of the winch hook during storage; and the movable opening that allows a rope to move is formed on a back face of the guiding groove, such that movement of the rope is not affected. Arrangement of this structure avoids shaking with movement of the vehicle after the winch hook is stored, thereby enhancing aesthetics and reducing noise. Further, the winch hook can be easily tightened by means of the winch and securely locked in the guiding groove. Compared to traditional hooks, the winch hook has a uniform and clean appearance and is used as an indispensable tool for rescue and heavy-duty towing tasks in combination with a tow rope. Moreover, the winch hook boasts an impressive 14-pound breaking strength and a 7-pound safe working load (SWL), and is specifically designed for stubborn off-road enthusiasts and suitable for various vehicles, including trucks, trailers, SUVs, ATVs, UTVs and boats.

Figure 1:
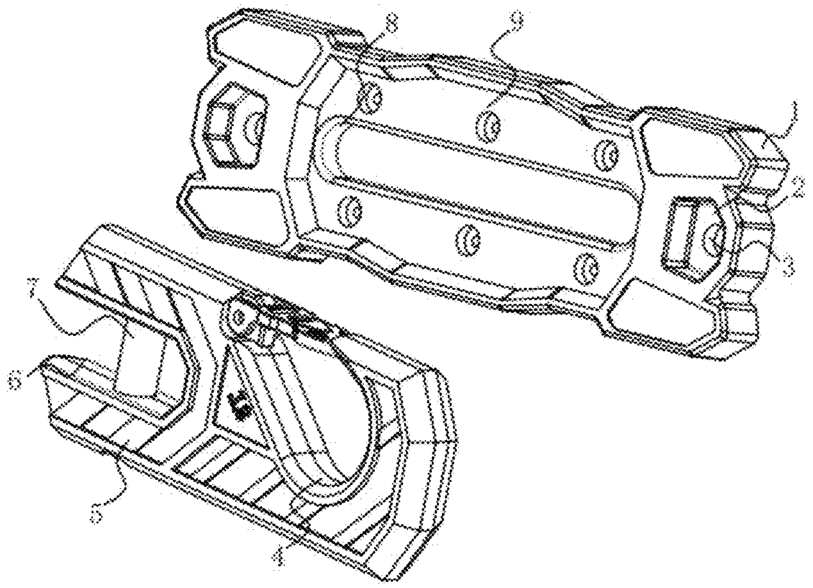
FIG. 1 is a structural schematic diagram of a multifunctional stable winch hook guide rail system according to Example 1 of the present disclosure.

Reference numerals in the figures: 1. storage buckle; 2. mounting opening; 3. through opening; 4. hanging opening; 5. winch hook; 6. fixed opening; 7. hanging rope pin; 8. movable opening; 9. guiding groove; 10. safety buckle; 11. insertion pin; 12. movable buckle; 13. connector; 14. first mounting frame; 15. first rotating block; 16. first extrusion wheel; 17. second extrusion wheel; 18. second mounting frame; 19. second rotating block; 20. drain outlet; 21. bolt; 22. fixed frame; 23. sealing cover; 24. iron sheet; 25. snap-in frame; 26. threaded hole; 27. bayonet; 28. connection port; and 29. magnetic block.

DETAILED DESCRIPTIONS OF THE EMBODIMENTS

The present disclosure will be further illustrated below in combination with the accompanying drawings and embodiments.

Example 1

Figure 2:
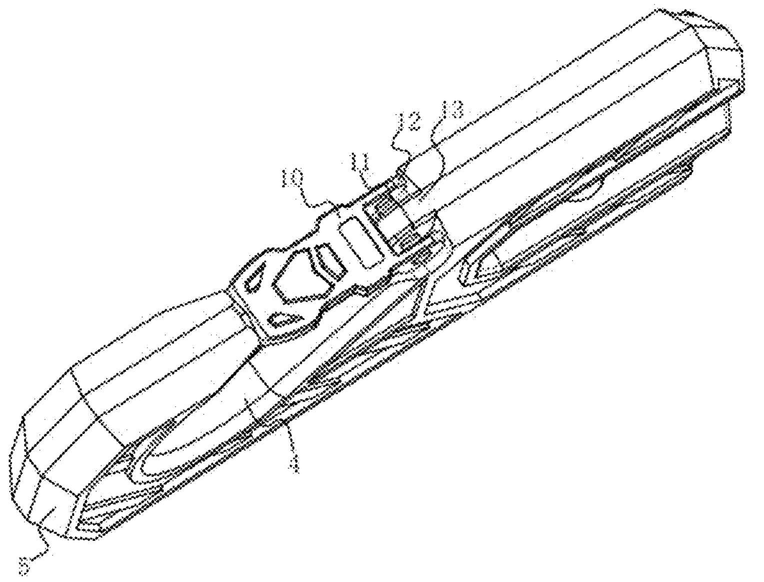
FIG. 2 is a structural schematic diagram of a safety buckle provided by the present disclosure.

Please refer to FIGS. 1 and 2, where FIG. 1 is a structural schematic diagram of a multifunctional stable winch hook guide rail system according to Example 1 of the present disclosure, and FIG. 2 is a structural schematic diagram of a safety buckle provided by the present disclosure. The multifunctional stable winch hook guide rail system includes: a storage buckle 1;

a guiding groove 9, where the guiding groove 9 is formed on a front face of the storage buckle 1, a movable opening 8 is formed on a back face of an inner wall of the guiding groove 9, and a winch hook 5 is arranged inside the guiding groove 9;

a hanging opening 4, where the hanging opening 4 is located at a top of the winch hook 5 at a position close to one end thereof, a side of an inner wall of the hanging opening 4 is fixedly connected to a connector 13, an outer surface of the connector 13, through an insertion pin 11, is rotatably connected to a movable buckle 12, one end of the movable buckle 12 is fixedly connected to a safety buckle 10, the other end of the winch hook 5 is provided with a fixed opening 6, and a hanging rope pin 7 is arranged inside the fixed opening 6; and the guiding groove 9 is internally provided with protrusions that enhance stability after the winch hook 5 is snap-fitted, structures of the storage buckle 1 and the winch hook 5 are illustrated in FIGS. 1 and 2, the winch hook 5 is a combination of an aluminum alloy guide hole and a G80 forged steel tow hook, which provides an ultimate solution for towing or recovering and withstands extreme weather conditions due to enhancement by galvanization and powder coating, the storage buckle 1 and the winch hook 5 are suitable for vehicles with a 10-inch spacing between electric winch mounting holes, a pair of stainless steel bolts and nuts is included, thus ensuring rust resistance and durability, and pairing with synthetic winch ropes is recommended to reduce wear.

A mounting opening 2 is formed on the front face of the storage buckle 1 at a position close to either end thereof respectively, and a through opening 3 is formed on a back face of an inner wall of either of the mounting openings 2; and the through openings 3 facilitate fixing of the storage buckle 1 at a corresponding position through bolts.

A working principle of the multifunctional stable winch hook guide rail system provided by the present disclosure is as follows:

The storage buckle 1 is installed at a designated position of a vehicle where the winch is installed, the guiding groove 9 is formed on the front face of the storage buckle 1, and the winch hook 5 can be stored through the guiding groove 9; grooves that correspond to protrusions on an outer surface of the winch hook 5 are arranged on the inner wall of the guiding groove 9, which increases stability of storing the winch hook 5; the movable opening 8 that allows a rope to move is formed on a back face of the guiding groove 9, such that movement of the rope is not affected; in practical use, the rope is first connected to the hanging rope pin 7 on the winch hook 5 through the movable opening 8, a user only needs to take the winch hook 5 out of the guiding groove 9 as needed to pull the rope for rescue, and after the rope is rolled up after the rescue, the user only needs to snap-fit the winch hook 5 into the guiding groove 9.

Compared with the related art, the multifunctional stable winch hook guide rail system provided by the present disclosure has the following beneficial effects:

To facilitate the fixing of the winch hook 5 after mounting of the winch, the storage buckle 1 is installed at a designated position of a vehicle where the winch is installed, the guiding groove 9 is formed on the front face of the storage buckle 1, and the winch hook 5 can be stored through the guiding groove 9; grooves that correspond to protrusions on an outer surface of the winch hook 5 are arranged on the inner wall of the guiding groove 9, which increases stability of the winch hook 5 during storage; and the movable opening 8 that allows a rope to move is formed on a back face of the guiding groove 9, such that movement of the rope is not affected. Arrangement of this structure avoids shaking with movement of the vehicle after the winch hook 5 is stored, thereby enhancing aesthetics and reducing noise. Further, the winch hook 5 can be easily tightened by means of the winch and securely locked in the guiding groove 9. Compared to traditional hooks, the winch hook 5 has a uniform and clean appearance and is used as an indispensable tool for rescue and heavy-duty towing tasks in combination with a tow rope. Moreover, the winch hook 5 boasts an impressive 33,000-pound breaking strength and a 17,600-pound safe working load (SWL), and is specifically designed for stubborn off-road enthusiasts and suitable for various vehicles, including trucks, trailers, SUVs, ATVs, UTVs and boats.

Example 2

Figure 3:
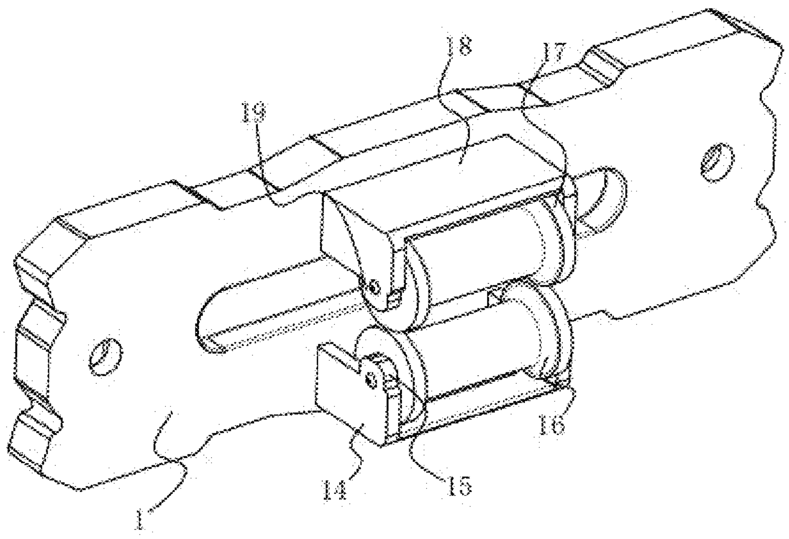
FIG. 3 is a structural schematic diagram of a multifunctional stable winch hook guide rail system according to Example 2 of the present disclosure.
Figure 4:
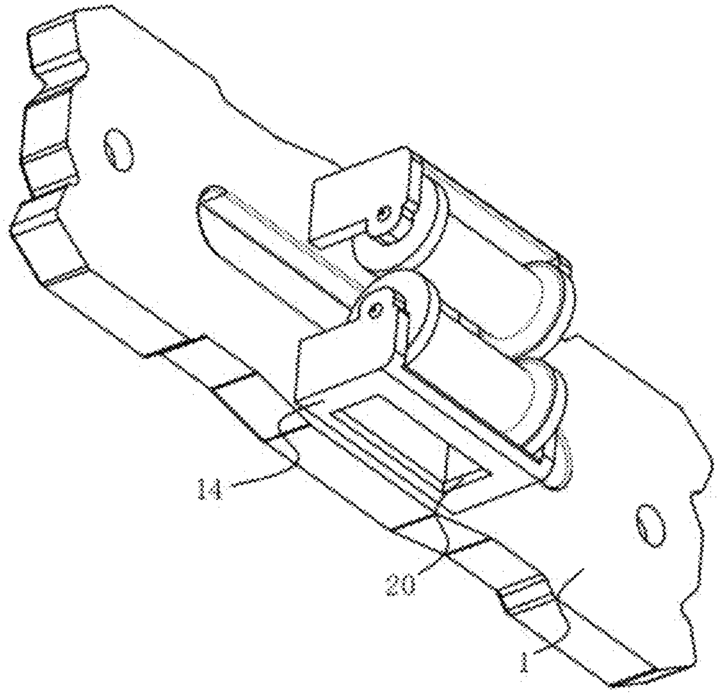
FIG. 4 is a structural schematic diagram of a drain outlet provided by the present disclosure.

Please refer to FIGS. 3 and 4, where FIG. 3 is a structural schematic diagram of a multifunctional stable winch hook guide rail system according to Example 2 of the present disclosure, and FIG. 4 is a structural schematic diagram of a drain outlet provided by the present disclosure. Based on the multifunctional stable winch hook guide rail system provided in Example 1 of the present disclosure, another multifunctional stable winch hook guide rail system is provided in Example 2 of the present disclosure. Example 2 is merely a preferred implementation of Example 1, and the implementation of Example 2 does not affect the independent implementation of Example 1.

Specifically, the multifunctional stable winch hook guide rail system provided in Example 2 of the present disclosure differs in that a first mounting frame 14 is fixedly connected to a back face of the storage buckle 1 at a position close to a bottom thereof, and two first rotating blocks 15 are mounted at a top of the first mounting frame 14 at a position close to the back face of the storage buckle 1; and the position for installing the storage buckle 1 is provided with openings for snap-in connection with the first mounting frame 14 and a second mounting frame 18, and positions of the first rotating blocks 15 are illustrated in FIG. 3.

A bottom of the first mounting frame 14 is provided with a drain outlet 20, and a first extrusion wheel 16 is rotatably connected between the two first rotating blocks 15; and the first extrusion wheel 16 and a second extrusion wheel 17 correspond to each other in positions, as illustrated in FIG. 3.

A second mounting frame 18 is fixedly connected to the back face of the storage buckle 1 at a position close to a top thereof, and a bottom of the second mounting frame 18 is rotatably connected to a second extrusion wheel 17 through two second rotating blocks 19; and the second extrusion wheel 17 and the first extrusion wheel 16 can be used to squeeze water out of a rescue rope.

Compared with the prior art, the multifunctional stable winch hook guide rail system provided by the present disclosure has the following beneficial effects:

To achieve the function of the storage buckle 1 in clearing water inside the rope, the first mounting frame 14 with the first rotating blocks 15 and the second mounting frame 18 with the second rotating blocks 19 are installed on the back face of the storage buckle 1, then the first extrusion wheel 16 and the second extrusion wheel 17 are installed between the two first rotating blocks 15 and between the two second rotating blocks 19 respectively, and a position between the first extrusion wheel 16 and the second extrusion wheel 17 is aligned with a position of a movable opening 8. An extrusion force applied by the first extrusion wheel 16 and the second extrusion wheel 17 can be used to squeeze the rope. When rolling up the rope after the rescue is completed, the first extrusion wheel 16 and the second extrusion wheel 17 will squeeze water (if any) out of the rope, and squeezed water is discharged through the drain outlet 20. This structure achieves a water-extrusion function of the storage buckle 1 and enhances its practicality.

Example 3

Figure 5:
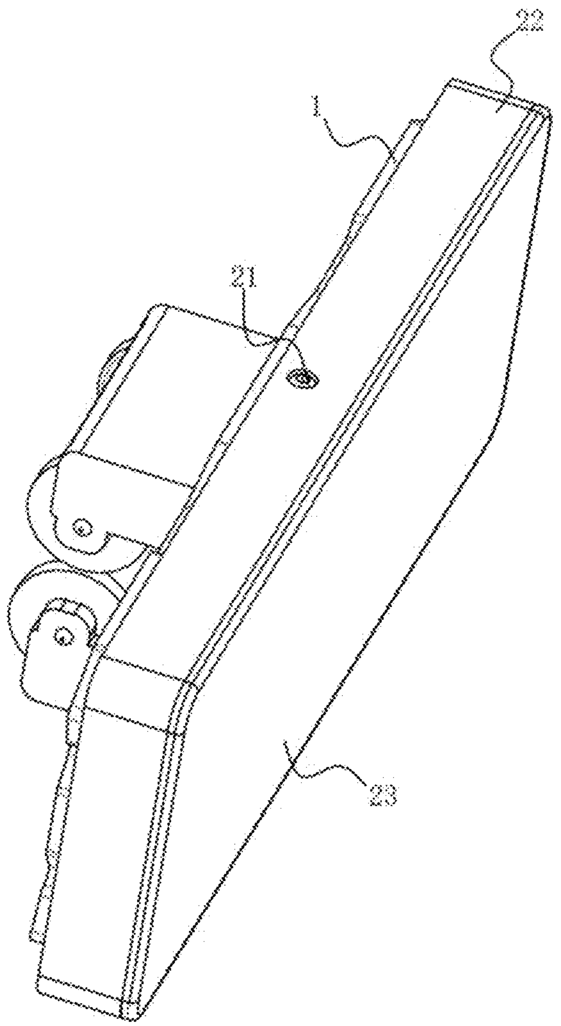
FIG. 5 is a structural schematic diagram of a multifunctional stable winch hook guide rail system according to Example 3 of the present disclosure.
Figure 6:
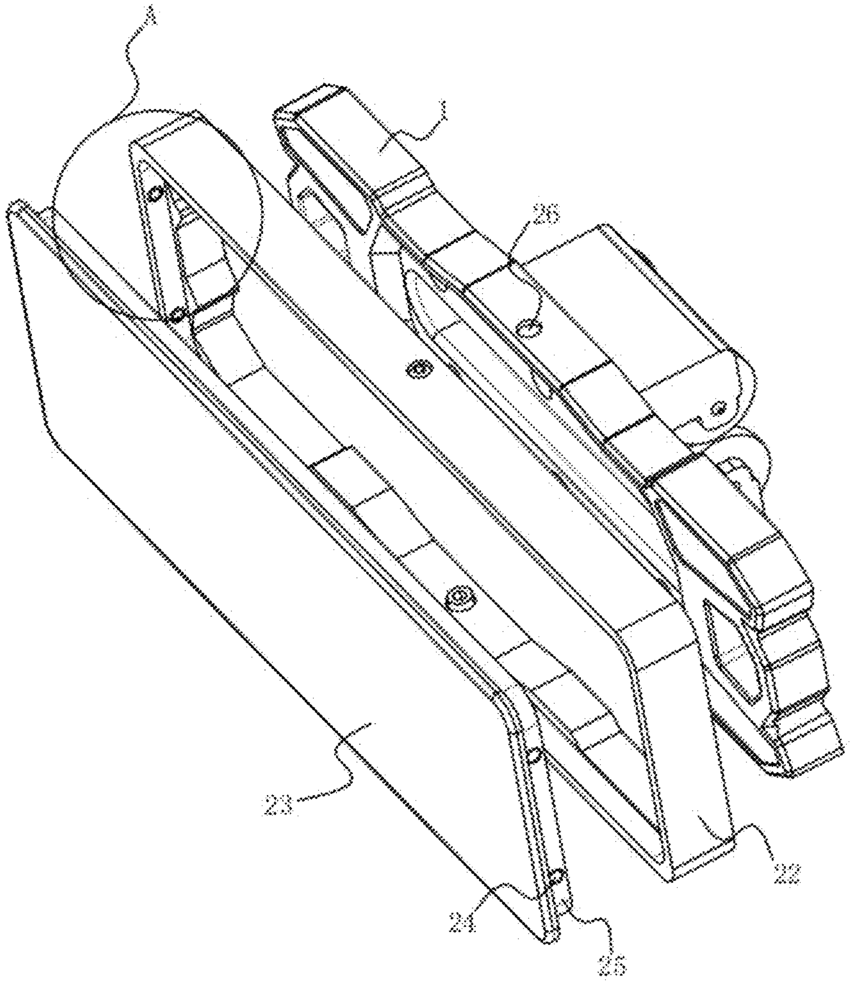
FIG. 6 is a structural schematic diagram of an iron sheet provided by the present disclosure.
Figure 7:
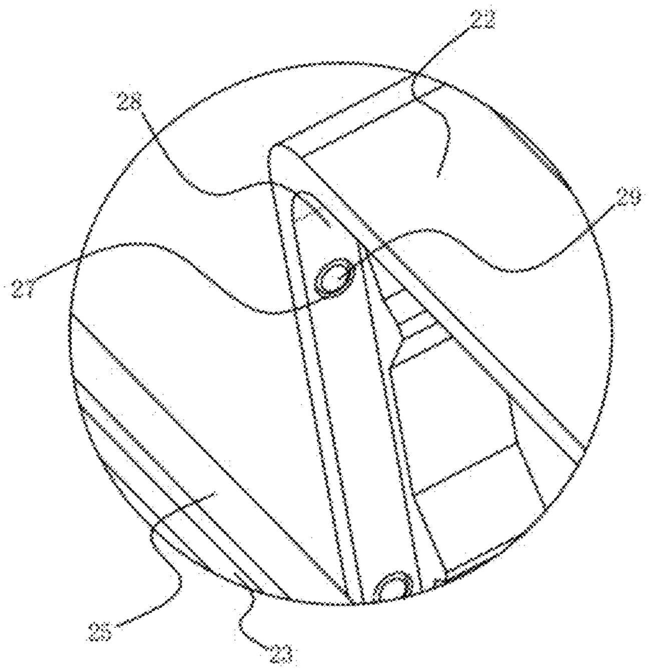
FIG. 7 is an enlarged view of a portion A illustrated in FIG. 6.

Please refer to FIGS. 5-7, where FIG. 5 is a structural schematic diagram of a multifunctional stable winch hook guide rail system according to Example 3 of the present disclosure, FIG. 6 is a structural schematic diagram of an iron sheet provided by the present disclosure, and FIG. 7 is an enlarged view of an A portion shown in FIG. 6. Based on the multifunctional stable winch hook guide rail system provided in Example 1 of the present disclosure, another multifunctional stable winch hook guide rail system is provided in Example 3 of the present disclosure. Example 3 is merely a preferred implementation of Example 1 and Example 2, and the implementation of Example 3 does not affect the independent implementation of Example 1 and Example 2.

Specifically, the multifunctional stable winch hook guide rail system provided in Example 3 of the present disclosure differs in that a top and a bottom of the storage buckle 1 are both provided with threaded holes 26, a fixed frame 22 is mounted on the outer surface of the storage buckle 1 through bolts 21, the front face of the fixed frame 22 is provided with a connection port 28, and magnetic blocks 29 are installed on both sides of an inner wall of the connection port 28 through bayonets 27; and openings that can be sleeved on the outer surface of the storage buckle 1 are formed on front and back faces of the fixed frame 22, the connection port 28 facilitates insertion of a snap-in frame 25, the magnetic blocks 29 are installed on both sides of the inner wall of the connection port 28 through the bayonets 27, and it is flat after installation, such that the insertion of a snap-in frame 25 is not affected.

The snap-in frame 25 is arranged inside the connection port 28, iron sheets 24 are fixedly connected to both sides of the snap-in frame 25, and a front face of the snap-in frame 25 is fixedly connected to a sealing cover 23; and the iron sheets 24 and the magnetic blocks 29 correspond to each other in positions, and the sealing cover 23, in combination of the fixed frame 22, is capable of sealing the storage buckle 1.

Compared with the prior art, the multifunctional stable winch hook guide rail system provided by the present disclosure has the following beneficial effects:

To prevent dust and debris from accumulating in the guiding groove 9 inside the storage buckle 1 that is installed in the front of the vehicle as time goes, the fixed frame 22 is mounted on the outer surface of the storage buckle 1 through the bolts 21, and an inner surface of the fixed frame 22 is provided with the connection port 28 that allows the insertion of the snap-in frame 25 on the sealing cover 23. The sealing cover 23 can be used to seal the front face of the storage buckle 1, which protects the winch hook 5 inside and reduces dust erosion. When the winch hook 5 is not in use, a user only needs to insert the snap-in frame 25 on a back face of the sealing cover 23 into the connection port 28, and to enable the magnetic blocks 29 and the iron sheets 24 to attract each other, so as to enhance stability of the sealing cover 23 and prevent pinching fingers, thus increasing safety. When the winch hook 5 is needed, the user only needs to remove the sealing cover 23 to take the winch hook 5 out of the guiding groove 9. This structure enhances protection of the front face of the storage buckle 1, and reduces accumulation of dust and debris on the front face of the storage buckle 1.

The foregoing are merely examples of the present disclosure and are not intended to limit the patent scope of the present disclosure. Any equivalent structure or equivalent process transformation made by using the description of the present disclosure and the contents of the accompanying drawings, or directly or indirectly used in other related technical fields, are all similarly included in the scope of patent protection of the present disclosure.

What is claimed is:

1. A multifunctional stable winch hook guide rail system, comprising:

a main body;

a guiding groove, wherein the guiding groove is formed on a front face of the main body, a movable opening is formed on a back face of an inner wall of the guiding groove, and a winch hook is arranged inside the guiding groove;

a hanging opening, wherein the hanging opening is located at a top of the winch hook at a position close to one end thereof, a side of an inner wall of the hanging opening is provided with a connecting end, an outer surface of the connecting end, through an insertion pin, is connected with a male buckle, one end of the male buckle is fixedly connected to a female buckle provided on another side of the hanging opening, the male buckle and the female buckle are connected to formed a safety buckle, the other end of the winch hook is provided with a fixed opening, and a hanging rope pin is arranged inside the fixed opening; and wherein a top and a bottom of the main body are both provided with threaded holes, a fixed frame is mounted on the outer surface of the main body through bolts, the front face of the fixed frame is provided with a connection port, and magnetic blocks are installed on both sides of an inner wall of the connection port through bayonet pins.

2. The multifunctional stable winch hook guide rail system according to claim 1, wherein a mounting opening is formed on the front face of the main body at a position close to either end thereof respectively, and a through opening is formed on a back face of an inner wall of the mounting opening.

3. The multifunctional stable winch hook guide rail system according to claim 1, wherein a first mounting frame is fixedly connected to a back face of the main body at a position close to a bottom thereof, and two first rotating blocks are mounted at a top of the first mounting frame at a position close to the back face of the main body.

4. The multifunctional stable winch hook guide rail system according to claim 3, wherein a bottom of the first mounting frame is provided with a drain outlet, and a first extrusion wheel is rotatably connected between the two first rotating blocks.

5. The multifunctional stable winch hook guide rail system according to claim 1, wherein a second mounting frame is fixedly connected to the back face of the main body at a position close to a top thereof, and a bottom of the second mounting frame is rotatably connected to a second extrusion wheel through two second rotating blocks.

6. The multifunctional stable winch hook guide rail system according to claim 1, wherein a snap-in frame is arranged inside the connection port, iron sheets are fixedly connected to both sides of the snap-in frame, and a front face of the snap-in frame is fixedly connected to a sealing cover.

* * * * *